US010257101B2

(12) United States Patent
Golshan et al.

(10) Patent No.: US 10,257,101 B2
(45) Date of Patent: *Apr. 9, 2019

(54) ACTIVE APPLICATION RESPONSE DELAY TIME

(71) Applicant: A10 NETWORKS, INC., San Jose, CA (US)

(72) Inventors: Ali Golshan, Palo Alto, CA (US); Martin Grimm, Snoqualmie, WA (US); Yang Yang, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,974

(22) Filed: Feb. 27, 2018

(65) Prior Publication Data

US 2018/0191625 A1   Jul. 5, 2018

Related U.S. Application Data

(63) Continuation of application No. 14/231,421, filed on Mar. 31, 2014, now Pat. No. 9,942,162.

(51) Int. Cl.
  *G06F 15/173* (2006.01)
  *H04L 12/841* (2013.01)
  *H04L 12/803* (2013.01)
(52) U.S. Cl.
  CPC .......... *H04L 47/283* (2013.01); *H04L 47/125* (2013.01)
(58) Field of Classification Search
  CPC ........................... H04L 47/726; H04L 47/125
  (Continued)

(56) References Cited

U.S. PATENT DOCUMENTS 5,218,602 A    6/1993  Grant et al.
5,774,660 A    6/1998  Brendel et al.
(Continued)

FOREIGN PATENT DOCUMENTS

CN    1372662    10/2002
CN    1449618    10/2003
(Continued)

OTHER PUBLICATIONS

Abe, et al., "Adaptive Split Connection Schemes in Advanced Relay Nodes," IEICE Technical Report, 2010, vol. 109 (438), pp. 25-30.
(Continued)

*Primary Examiner* — Joseph E Avellino
*Assistant Examiner* — Marshall M McLeod
(74) *Attorney, Agent, or Firm* — Keith Kline; The Kline Law Firm PC

(57) ABSTRACT

Provided are methods and systems for load balancing client requests between sites associated with a domain name. A method comprises determining a first active response delay time between a Domain Name System server and a first site. The method further comprises determining a first application response delay time between the first site and one or more first servers associated with the first site. According to the method, the first active response delay time and the first application response delay time are compounded to produce a first compounded response delay time. The method further comprises determining a second active response delay time and a second application response delay for a second site to produce a second compounded response delay time. The first compounded response delay time and the second compounded response delay time are compared to perform load balancing between the first site and the second site.

20 Claims, 5 Drawing Sheets

(58) Field of Classification Search
USPC .................. 709/239, 238, 204, 217, 223
See application file for complete search history.

(56) References Cited

U.S. PATENT DOCUMENTS

| | | |
|---|---|---|
| 5,935,207 A | 8/1999 | Logue et al. |
| 5,958,053 A | 9/1999 | Denker |
| 5,995,981 A | 11/1999 | Wikstrom |
| 6,003,069 A | 12/1999 | Cavill |
| 6,047,268 A | 4/2000 | Bartoli et al. |
| 6,131,163 A | 10/2000 | Wiegel |
| 6,219,706 B1 | 4/2001 | Fan et al. |
| 6,259,705 B1 | 7/2001 | Takahashi et al. |
| 6,321,338 B1 | 11/2001 | Porras et al. |
| 6,374,300 B2 | 4/2002 | Masters |
| 6,459,682 B1 | 10/2002 | Ellesson et al. |
| 6,587,866 B1 | 7/2003 | Modi |
| 6,748,414 B1 | 6/2004 | Bournas |
| 6,772,334 B1 | 8/2004 | Glawitsch |
| 6,779,017 B1 | 8/2004 | Lamberton et al. |
| 6,779,033 B1 | 8/2004 | Watson et al. |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,167,927 B2 | 1/2007 | Philbrick et al. |
| 7,181,524 B1 | 2/2007 | Lele |
| 7,218,722 B1 | 5/2007 | Turner et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,739,395 B1 | 6/2010 | Parlamas et al. |
| 7,747,748 B2 | 6/2010 | Allen |
| 7,751,409 B1 | 7/2010 | Carolan |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,970,934 B1 | 6/2011 | Patel |
| 7,979,585 B2 | 7/2011 | Chen et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,090,866 B1 | 1/2012 | Bashyam et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 9,497,201 B2 | 11/2016 | Chen et al. |
| 9,531,846 B2 | 12/2016 | Han et al. |
| 9,544,364 B2 | 1/2017 | Jalan et al. |
| 9,602,442 B2 | 3/2017 | Han |
| 9,609,052 B2 | 3/2017 | Jalan et al. |
| 9,705,800 B2 | 7/2017 | Sankar et al. |
| 9,843,484 B2 | 12/2017 | Sankar et al. |
| 9,900,252 B2 | 2/2018 | Chiong |
| 9,906,422 B2 | 2/2018 | Jalan et al. |
| 9,906,591 B2 | 2/2018 | Jalan et al. |
| 2001/0049741 A1 | 12/2001 | Skene et al. |
| 2002/0032777 A1 | 3/2002 | Kawata et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |

(56) References Cited

U.S. PATENT DOCUMENTS

| | | |
|---|---|---|
| 2003/0035420 A1 | 2/2003 | Niu |
| 2003/0065762 A1 | 4/2003 | Stolorz et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hatid et al. |
| 2005/0289231 A1 | 12/2005 | Harada et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1* | 11/2008 | Blander .............. H04L 67/1029 718/105 |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1* | 2/2010 | Hazlewood .......... G06F 15/173 709/226 |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0210265 A1 | 8/2010 | Borzsei et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0228878 A1 | 9/2010 | Xu et al. |
| 2010/0235507 A1 | 9/2010 | Szeto et al. |
| 2010/0235522 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0060840 A1 | 3/2011 | Susai et al. |
| 2011/0093522 A1* | 4/2011 | Chen ................ H04L 29/12066 709/203 |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |

(56) References Cited

U.S. PATENT DOCUMENTS

| | | |
|---|---|---|
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshehandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0151353 A1 | 6/2012 | Joanny |
| 2012/0170548 A1 | 7/2012 | Rajagopalan et al. |
| 2012/0173759 A1 | 7/2012 | Agarwal et al. |
| 2012/0191839 A1* | 7/2012 | Maynard ............... G06F 9/505 709/223 |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0124713 A1 | 5/2013 | Feinberg et al. |
| 2013/0148500 A1 | 6/2013 | Sonoda et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2013/0250765 A1 | 9/2013 | Ehsan et al. |
| 2013/0250770 A1 | 9/2013 | Zou et al. |
| 2013/0258846 A1 | 10/2013 | Damola |
| 2013/0268646 A1 | 10/2013 | Doron et al. |
| 2013/0282791 A1 | 10/2013 | Kruglick |
| 2013/0336159 A1 | 12/2013 | Previdi et al. |
| 2014/0226658 A1 | 8/2014 | Kakadia et al. |
| 2014/0235249 A1 | 8/2014 | Jeong et al. |
| 2014/0248914 A1 | 9/2014 | Aoyagi et al. |
| 2014/0258465 A1 | 9/2014 | Li |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0325649 A1 | 10/2014 | Zhang |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0098333 A1 | 4/2015 | Lin et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0281087 A1 | 10/2015 | Jalan et al. |
| 2015/0281104 A1 | 10/2015 | Golshan et al. |
| 2015/0296058 A1 | 10/2015 | Jalan et al. |
| 2015/0312268 A1 | 10/2015 | Ray |
| 2015/0350048 A1 | 12/2015 | Sampat et al. |
| 2015/0350379 A1 | 12/2015 | Jalan et al. |
| 2016/0042014 A1 | 2/2016 | Jalan et al. |
| 2016/0044095 A1 | 2/2016 | Sankar et al. |
| 2016/0088074 A1 | 3/2016 | Kannan et al. |
| 2016/0094470 A1 | 3/2016 | Skog |
| 2016/0139910 A1 | 5/2016 | Ramanathan et al. |
| 2016/0164792 A1 | 6/2016 | Oran |

FOREIGN PATENT DOCUMENTS

| | | |
|---|---|---|
| CN | 1473300 | 2/2004 |
| CN | 1529460 | 9/2004 |
| CN | 1575582 | 2/2005 |
| CN | 1714545 | 12/2005 |
| CN | 1725702 | 1/2006 |
| CN | 1910869 | 2/2007 |
| CN | 101004740 | 7/2007 |
| CN | 101094225 | 12/2007 |
| CN | 101163336 | 4/2008 |
| CN | 101169785 | 4/2008 |
| CN | 101189598 | 5/2008 |
| CN | 101193089 | 6/2008 |
| CN | 101247349 | 8/2008 |
| CN | 101261644 | 9/2008 |
| CN | 101495993 | 7/2009 |
| CN | 101878663 | 11/2010 |
| CN | 102143075 | 8/2011 |
| CN | 102546590 | 7/2012 |
| CN | 102571742 A | 7/2012 |
| CN | 102577252 A | 7/2012 |
| CN | 102918801 A | 2/2013 |
| CN | 103533018 | 1/2014 |
| CN | 103944954 | 7/2014 |
| CN | 104040990 | 9/2014 |
| CN | 104067569 A | 9/2014 |
| CN | 104106241 | 10/2014 |
| CN | 104137491 | 11/2014 |
| CN | 104796396 | 7/2015 |
| CN | 102577252 B | 3/2016 |
| CN | 102918801 B | 5/2016 |
| CN | 102571742 B | 7/2016 |
| CN | 104067569 B | 2/2017 |
| EP | 1209876 | 5/2002 |
| EP | 1770915 | 4/2007 |
| EP | 1885096 | 2/2008 |
| EP | 2296313 | 3/2011 |
| EP | 2577910 | 4/2013 |
| EP | 2622795 | 8/2013 |
| EP | 2647174 | 10/2013 |
| EP | 2760170 A1 | 7/2014 |
| EP | 2772026 A1 | 9/2014 |
| EP | 2901308 | 8/2015 |
| EP | 2760170 B1 | 12/2015 |
| EP | 2772026 B1 | 2/2017 |
| HK | 1182560 | 11/2013 |
| HK | 1183569 | 12/2013 |
| HK | 1183996 | 1/2014 |
| HK | 1189438 | 1/2014 |
| HK | 1198565 | 5/2015 |
| HK | 1198848 | 6/2015 |
| HK | 1199153 | 6/2015 |
| HK | 1199779 | 7/2015 |
| HK | 1200617 | 8/2015 |
| IN | 3764CHN2014 | 9/2015 |
| IN | 261CHE2014 | 1/2016 |
| IN | 1668CHENP2015 | 7/2016 |
| JP | H0997233 | 4/1997 |
| JP | H1196128 | 4/1999 |
| JP | H11338836 | 12/1999 |
| JP | 2000276432 | 10/2000 |
| JP | 2000307634 | 11/2000 |
| JP | 2001051859 | 2/2001 |
| JP | 2001298449 | 10/2001 |
| JP | 2002091936 | 3/2002 |
| JP | 2003141068 | 5/2003 |
| JP | 2003186776 | 7/2003 |
| JP | 2005141441 | 6/2005 |
| JP | 2006332825 | 12/2006 |
| JP | 2008040718 | 2/2008 |
| JP | 2009500731 | 1/2009 |
| JP | 2013528330 | 7/2013 |
| JP | 2014504484 | 2/2014 |
| JP | 2014143686 | 8/2014 |
| JP | 2015507380 | 3/2015 |
| JP | 5855663 | 2/2016 |
| JP | 5906263 | 4/2016 |
| JP | 5913609 | 4/2016 |
| JP | 5946189 | 7/2016 |
| JP | 5963766 | 8/2016 |
| KR | 20080008340 | 1/2008 |
| KR | 100830413 | 5/2008 |
| KR | 20130096624 | 8/2013 |

(56) References Cited

FOREIGN PATENT DOCUMENTS

| KR | 101576585 | 12/2015 | | |
|---|---|---|---|---|
| KR | 101632187 | 6/2016 | | |
| KR | 101692751 | 1/2017 | | |
| WO | WO2001013228 | 2/2001 | | |
| WO | WO2001014990 | 3/2001 | | |
| WO | WO2001045349 | 6/2001 | | |
| WO | WO2003103237 | 12/2003 | | |
| WO | WO2004084085 | 9/2004 | | |
| WO | WO2006098033 | 9/2006 | | |
| WO | WO2008053954 | 5/2008 | | |
| WO | WO2008078593 | 7/2008 | | |
| WO | WO2011049770 | 4/2011 | | |
| WO | WO2011079381 | 7/2011 | | |
| WO | WO2011149796 | 12/2011 | | |
| WO | WO2012050747 | 4/2012 | | |
| WO | WO2012075237 | 6/2012 | | |
| WO | WO2012083264 | 6/2012 | | |
| WO | WO2012097015 | 7/2012 | | |
| WO | WO2013070391 | 5/2013 | | |
| WO | WO2013081952 | 6/2013 | | |
| WO | WO2013096019 | 6/2013 | | |
| WO | WO2013112492 | 8/2013 | | |
| WO | WO2013189024 | 12/2013 | | |
| WO | WO-2013189024 A1 * | 12/2013 | ........... | H04L 67/101 |
| WO | WO2014031046 | 2/2014 | | |
| WO | WO2014052099 | 4/2014 | | |
| WO | WO2014088741 | 6/2014 | | |
| WO | WO2014093829 | 6/2014 | | |
| WO | WO2014138483 | 9/2014 | | |
| WO | WO2014144837 | 9/2014 | | |
| WO | WO2014179753 | 11/2014 | | |
| WO | WO2015153020 | 10/2015 | | |

OTHER PUBLICATIONS

Cardellini, et al., "Dynamic Load Balancing on Web-Server Systems," IEEE Internet Computing, 1999, vol. 3 (3), pp. 28-39.
FreeBSD, "tcp—TCP Protocal," Linux Programme s Manual [online], 2007, [retrieved on Apr. 13, 2016], Retreived from the Internet: <https://www.freebsd.org/cgi/man.cgi?query=tcp&apropos=0&sektion=7&manpath=SuSe+Linux%2Fi386+11.0&format=asci>.
Gite, "Linux Tune Network Stack (Buffers Size) to Increase Networking Performance," nixCraft [online], 2009, [retreived on Apr. 13, 2016], Retreived from the Internet: <URL:http://www.cyberciti.biz/faq/linux-tcp-tuning/>.
Goldszmidt, et al., "NetDispatcher: A TCP Connection Router," IBM Researc Report, RC 20853, 1997, pp. 1-31.
Kjaer, et al., "Resource Allocation and Disturbance Rejection in Web Servers Using SLAs and Virtualized Servers," IEEE Transactions on Network Service Management, 2009, vol. 6 (4), pp. 226-239.
Koike, et al., "Transport Middleware for Network-Based Control," IEICE Technical Report, 2000, vol. 100 (53), pp. 13-18.
Sharifian, et al., "An Approximation-Based Load-Balancing Algorithm with Admission Control for Cluster Web Servers with Dynamic Workloads," The Journal of Supercomputing, 2010, vol. 53 (3), pp. 440-463.
Spatscheck, et al., "Optimizing TCP Forwarder Performance," IEEE/ACM Transactions on Networking, 2000, vol. 8 (2), pp. 146-157.
Search Report and Written Opinion dated Jun. 8, 2015 for PCT Application No. PCT/US2015/017521.
Yamamoto, et al., "Performance Evaluation of Window Size in Proxy-Based TCP for Multi-Flop Wireless Networks," IPSJ SIG Technical Reports, 2008, vol. 2008 (44), pp. 109-114.

* cited by examiner

ACTIVE APPLICATION RESPONSE DELAY TIME

CROSS REFERENCE TO RELATED APPLICATIONS

The present application is a continuation of U.S. patent application Ser. No. 14/231,421, filed Mar. 31, 2014, entitled "Active Application Response Delay Time", which is incorporated by reference herein in its entirety, including all references cited therein.

TECHNICAL FIELD

This disclosure relates generally to data processing and, more specifically, to load balancing of client requests between sites in computer networks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

When a web client (e.g., a web browser,) attempts to access a domain, namely a website associated with the domain, a client request is transmitted to a local Domain Name System (DNS) server. The local DNS server is responsible for routing client requests to desired domains. The local DNS server, in turn, can send a request to the Global Server Load Balancer (GSLB) associated with the desired domain. The GSLB can balance client requests across multiple websites associated with the domain. In order for the GSLB to determine which website is better equipped at the moment to process a specific client request, the GSLB can instruct Site Load Balancers (SLB) associated with corresponding websites to send requests to the local DNS server. The local DNS server can respond to the SLBs, so that round trip times between the local DNS server and different SLBs can be calculated. The website with the shortest round trip between the SLB and the local DNS server can be selected for delivery of client requests for a period of time. Each website can be associated with a Virtual IP (VIP). When the GSLB decides to which website to deliver the client requests, the corresponding VIP can be returned to the GSLB. The GSLB can send the VIP of the selected web site to the local DNS server. Thereafter, the local DNS server can route client requests to the SLB associated with the selected website for a period of time.

Web sites can use a plurality of web servers to serve a number of web clients accessing the web sites. When the SLB associated with the selected website receives a client request from a web client, the SLB can select one or more web servers associated with the web site, and relay the client request to the selected web servers. The problem with existing solutions is that calculating round trips between the LDNS and sites is not necessarily indicative of the round trip between the LDNS and web servers because slow data traffic between the site and its servers can make another site a better candidate even though the roundtrip between the site and the LDNS appears to indicate otherwise. Thus, it is important to select the right site with fastest round trips between the client and the servers associated with the site.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to load balancing DNS requests. In one embodiment, a method for load balancing DNS requests includes determining a first active response delay time between a DNS server and a first site. The method further includes determining a first application response delay time between the first site and one or more first servers associated with the first site. According to the method, a first compounded response delay time is determined based on the first active response delay time and the first application response delay time. The method further includes determining a second active response delay time between the DNS server and a second site. Furthermore, a second application response delay time between the second site and one or more second servers associated with the second site is determined. Based on the second active response delay time and the second application response delay time, a second compounded response delay time is determined. The first compounded response delay time and the second compounded response delay time are compared. Based on the comparison, a server is selected from the one or more first servers associated with the first site and the one or more second servers associated with the second site.

In another embodiment of the present disclosure, there is provided a system for load balancing DNS requests. The system may include a global site load balancer and a database. The global site load balancer may be configured to determine a first active response delay time between a DNS server and a first site. The global site load balancer may be further configured to determine a first application response delay time between the first site and one or more first servers associated with the first site. The global site load balancer may be configured to determine a first compounded response delay time based on the first active response delay time and the first application response delay time. Furthermore, the global site load balancer may be configured to determine a second active response delay time between the DNS server and a second site. The global site load balancer may be further configured to determine a second application response delay time between the second site and one or more second servers associated with the second site. The global site load balancer may be further configured to determine a second compounded response delay time based on the second active response delay time and the second application response delay time. Furthermore, the global site load balancer may be configured to compare the first compounded response delay time and the second compounded response delay time. Based on the comparison, the global site load balancer may select a server from the one or more first servers associated with the first site and the one or more second servers associated with the second site. The database may be configured to store at least data associated with the first application response delay time, the first active response delay time, the second application response delay time, the second active response delay time, the first compounded response delay time, and the second compounded response delay time.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
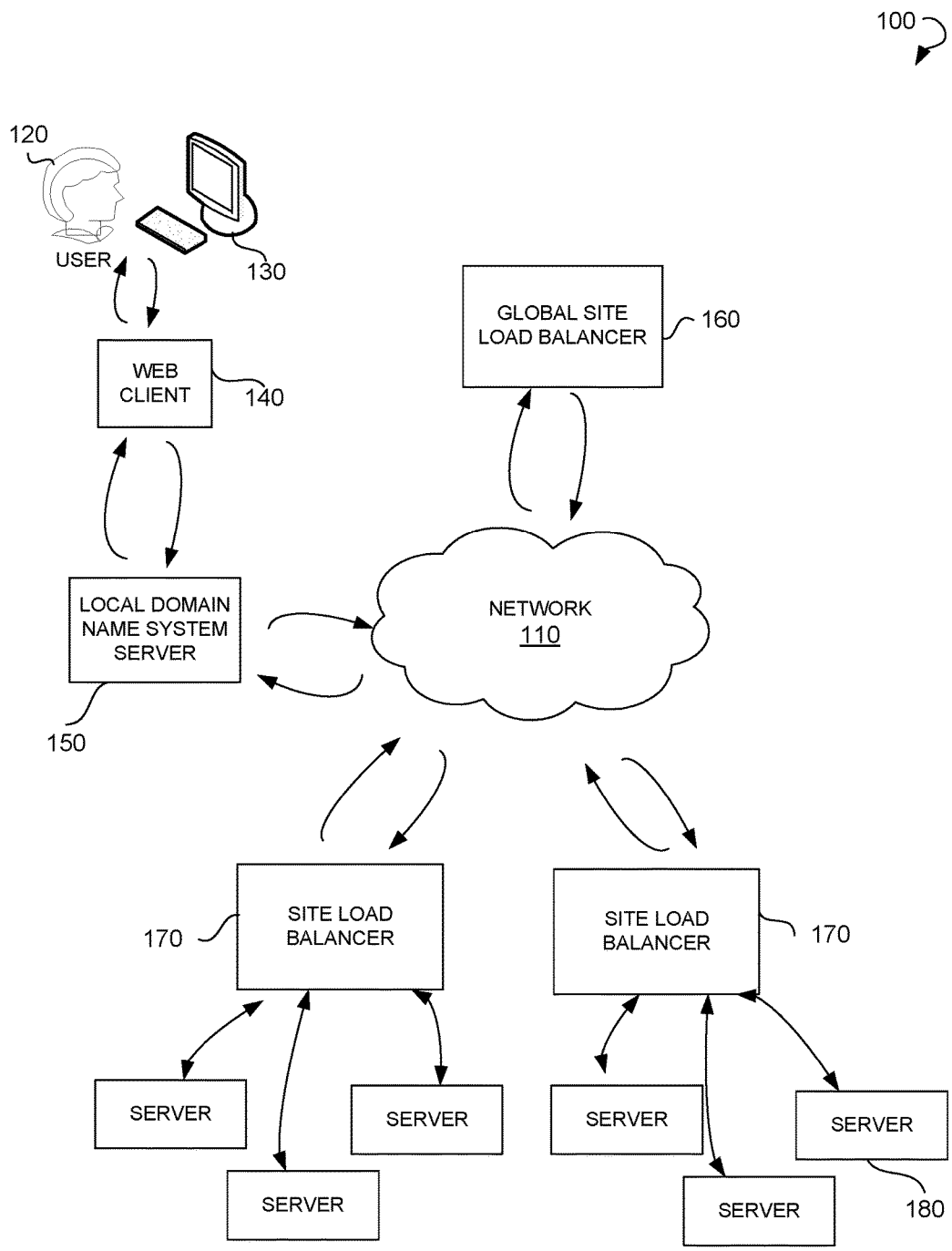
FIG. 1 shows an environment within which methods and systems for load balancing client requests between sites associated with a domain name can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The present disclosure relates to implementing load balancing in a data network by taking into consideration a round trip time between a local DNS server associated with a web client and a web server associated with a website to which the web server directs a client request. Existing solutions can perform load balancing based on a round trip time between the web client and the web site. More specifically, the client requests are balanced based on the round-trip time between the local DNS server associated with the web client and a SLB associated with the web site. The round trip time between the local DNS server and the SLB is not necessarily indicative of the round trip between web servers associated with the website and the local DNS server. Therefore, methods and systems of the present disclosure calculate the combined round trip time, which is the sum of the round-trip times between the local DNS server and the SLB and between the SLB and corresponding web servers.

More specifically, a web client of a user can send a domain request to the local DNS server, namely a request for a VIP of the site. The local DNS server sends the received request to the GSLB. The GSLB decides, depending on a plurality of metrics, which VIP is to be returned back to the DNS. The decision can be made based on a geographical location of the user and the geographical location of the requested domain (i.e., requested site). In particular, the GSLB is authoritative to maintain a name server for the domains. The GSLB instructs SLBs associated with the sites to send a request to the local DNS server for a domain that is already in a cache of the local DNS server, such as, for example, www.google.com. Each of the SLBs sends the request to the local DNS server, receives the response from the local DNS server, and measures a response time to obtain the site response time.

The SLB is responsible for distributing the requests to backend servers of the site. According to the method discussed herein, the SLB measures the response time of the servers according to existing embedded functionalities (e.g., health checks, and so forth). After measuring the server response time, the SLB calculates the total response time for the servers to which the user request may be directed. The total response time is a sum of the site response time and the server response time. The SLB of each site reports the calculated total response time to the GSLB.

The GSLB stores a table in which the sites and the corresponding total response times are listed. In response to the domain request of the web client, the GSLB sends the VIP of the site having the lowest total response time to the local DNS server. The local DNS server directs the domain request to the VIP of the selected site.

Referring now to the drawings, FIG. 1 illustrates an environment 100 within which a method and a system for load balancing client requests between sites associated with a domain name can be implemented. The environment 100 includes a network 110, a user 120, a client device 130, a web client 140, a local DNS server 150, a GSLB 160, a plurality of SLBs 170, and a plurality of servers 180. The user 120 uses the client device 130 to send client requests to a domain associated with the servers 180. The requests include a Hyper Text Transfer Protocol (HTTP) request, a File Transfer Protocol (FTP) request, and so forth. The client device 130 includes the web client 140, such as a browser. The local DNS server 150 is located in the vicinity of the web client 140. The servers 180 include a web server, a wireless application server, an interactive television server, and so forth.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication. The network 110 may include an SDN. The SDN may include one or more of the above network types. Generally, the network 110 may include a number of similar or dissimilar devices connected together by a transport medium enabling communication between the devices by using a predefined protocol. Those skilled in the art will recognize that the present disclosure may be practiced within a variety of network configuration environments and on a variety of computing devices.

The local DNS server 150 receives the client request of the web client 140. Based on the instructions received from the GSLB 160, the local DNS server 150 sends the client request to one of the SLBs 170. After receiving the client request, one of the SLBs 170 delivers the client request to the corresponding one or more servers 180.

Figure 2:
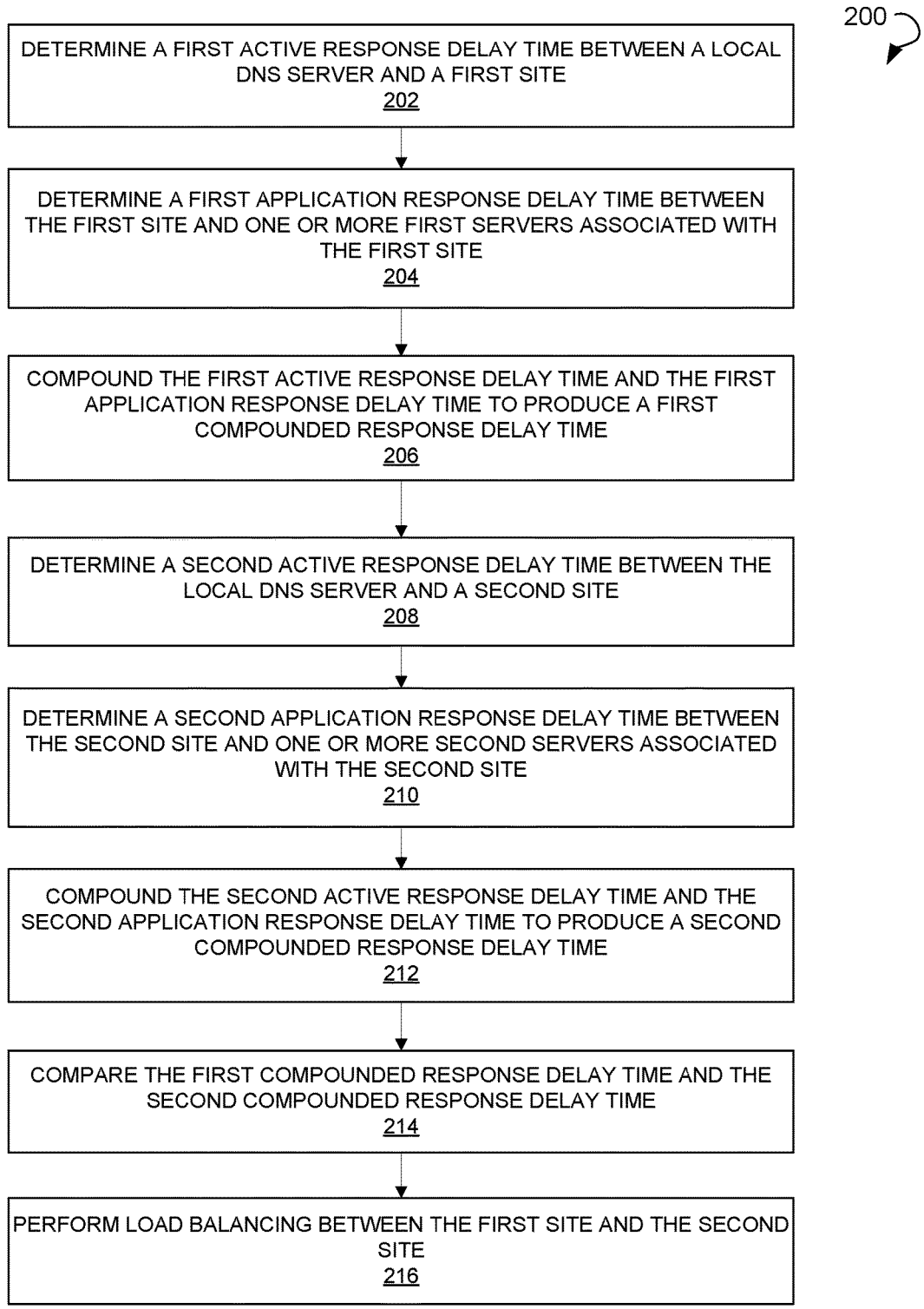
FIG. 2 is a process flow diagram showing a method for load balancing client requests between sites associated with a domain name.

FIG. 2 is a process flow diagram showing a method 200 for load balancing client requests between sites associated with a domain name, according to an example embodiment. The method 200 may be performed by processing logic that comprises hardware (e.g., decision making logic, dedicated logic, programmable logic, and microcode), software (such as software running on a general-purpose computer system or a dedicated machine), or a combination of both.

The method 200 commences with determining a first active response delay time between a local DNS server and a first site at operation 202. In an example embodiment, the determining of the first active response delay time starts with sending a request from a SLB associated with the first site to the local DNS server. The request is associated with a first time. The local DNS server receives the request and sends a response. The SLB associated with the first site receives the response from the local DNS server. The response is associated a second time. The determining of the first active response delay time further includes determining a time difference between the first time and the second time to obtain the first active response delay time.

At operation 204, a first application response delay time between the first site and one or more first servers associated with the first site is determined. In an example embodiment, the determining of the first application response delay time starts with sending a request from the SLB associated with the first site to the one or more servers associated with the first site. The request is associated with a first time. The one or more servers receive the request and send a response to the SLB associated with the first site. The SLB associated with the first site receives the response from the one or more servers. The response is associated with a second time. After receiving the first time and the second time, a time difference between the first time and the second time is determined to obtain the first application response delay time.

After receiving the first active response delay time and first application response delay time, a first compounded response delay time is calculated at operation 206. The first compounded response delay time is a sum of the first active response delay time and the first application response delay time.

The method 200 continues with determining a second active response delay time between the local DNS server and a second site at operation 208. In an example embodiment, the determining of the second active response delay time starts with sending a request from a SLB associated with the second site to the local DNS server. The request is associated with a first time. The local DNS server receives the request and sends a response. The SLB associated with the second site receives the response from the local DNS server. The response is associated a second time. The determining of the second active response delay time further includes determining a time difference between the first time and the second time to obtain the first active response delay time.

At operation 210, a second application response delay time between the second site and one or more second servers associated with the second site is determined. In an example embodiment, the determining of the second application response delay time starts with sending a request from the SLB associated with the second site to the one or more servers associated with the second site. The request is associated with a first time. The one or more servers receive the request and send a response to the SLB associated with the second site. The SLB associated with the second site receives the response from the one or more servers. The response is associated with a second time. After receiving the first time and the second time, a time difference between the first time and the second time is determined to obtain the second application response delay time.

After receiving the second active response delay time and the second application response delay time, a second compounded response delay time is calculated at operation 212. The second compounded response delay time is a sum of the second active response delay time and the second application response delay time.

After obtaining the first compounded response delay time and the second compounded response delay time, the first compounded response delay time and the second compounded response delay time are compared at operation 214. Based on the comparison, load balancing between the first site and the second site is performed at operation 216. The load balancing includes routing a client request to the site with the lowest compounded response delay time.

In an example embodiment, the method 200 optionally comprises reporting results of the comparison between the first compounded response delay time and the second compounded response delay time to a GSLB. The GSLB coordinates the load balancing between the first site and the second site.

In an example embodiment, the method 200 optionally comprises storing the first active response delay time and the first application response delay time into a database. Furthermore, method 200 optionally comprises storing the second active response delay time and the second application response delay time into the database. The method may further comprise retrieving the first application response delay time and the first active response delay time from the database upon receiving the client request. The method may further comprise retrieving the second application response delay time and second active response delay time from the database upon receiving the client request. Based on the retrieved data, the first compounded response delay time and the second compounded response delay time are calculated to perform load balancing.

In an example embodiment, the method 200 optionally comprises storing the first compounded response delay and the second compounded response delay into a database. The method may further comprise retrieving the first compounded response delay and the second compounded response delay from the database upon receiving the client request to perform the load balancing based on the retrieved data.

In an example embodiment, the method 200 comprises performing the following operations for determining the first site and the second site. Firstly, a geographical location for the local DNS server is determined. Furthermore, based on a client request, one or more sites are determined from a plurality of sites. For example, depending whether the client request is an HTTP request or an FTP request, the corresponding one or more sites are determined. A geographical location for the one or more determined sites is determined.

In an example embodiment, the method 200 comprises composing a table of responses. The table of responses includes an IP address associated with the local DNS server, an IP address associated with the first site, the first active response delay time, an IP address associated with the second site, the second active response delay time, and so forth. The table of responses is used to retrieve the necessary information upon receiving the client request.

Figure 3:
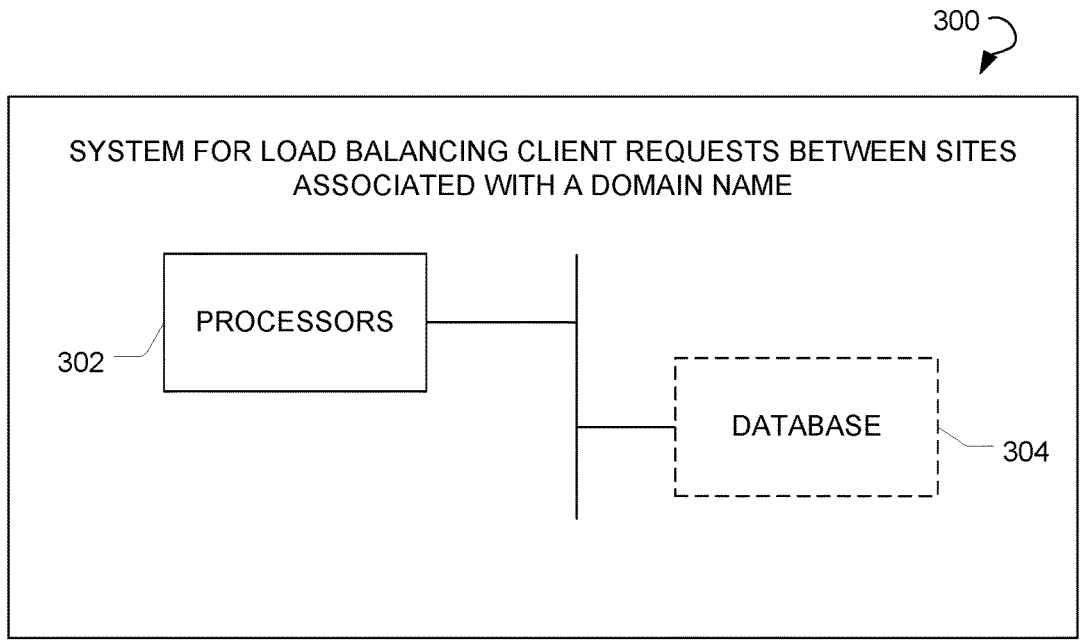
FIG. 3 is a block diagram showing various modules of a system for load balancing client requests between sites associated with a domain name.

FIG. 3 shows a block diagram illustrating various modules of an exemplary system 300 for load balancing client requests between sites associated with a domain name. The system 300 comprises one or more processors 302. The processors 302 are operable to determine a first active response delay time between a local DNS server and a first site. In an example embodiment, in order to determine the first active response delay time, the processors 302 are operable to send a request from a site load balancer associated with the first site to the local DNS server. The request is associated with a first time. The processors 302 are operable to receive a response from the local DNS server. The response is associated with a second time. Upon receiving the first time and the second time, the processors 302 determine a time difference between the first time and the second time to calculate the first application response delay time.

The processors 302 are also operable to determine a first application response delay time between the first site and one or more first servers associated with the first site. In an example embodiment, in order to determine the first application response delay time, the processors 302 are operable to send a request from a site load balancer associated with the first site to the one or more servers associated with the first site. The request is associated with a first time. The processors 302 are operable to receive a response from the one or more servers. The response is associated with a second time. Upon receiving the first time and the second time, the processors 302 determine a time difference between the first time and the second time to obtain the first application response delay time.

Upon receiving the first active response delay time and the first application response delay time, the processors 302 compound the first active response delay time and the first application response delay time to produce a first compounded response delay time.

Furthermore, the processors 302 are operable to determine a second active response delay time between the local DNS server and a second site. In an example embodiment, in order to determine the second active response delay time, the processors 302 are operable to send a request from a site load balancer associated with the second site to the local DNS server. The request is associated with a first time. The processors 302 are operable to receive a response from the local DNS server. The response is associated with a second time. Upon receiving the first time and the second time, the processors 302 determine a time difference between the first time and the second time to calculate the second application response delay time.

The processors 302 are also operable to determine a second application response delay time between the second site and one or more second servers associated with the second site. In an example embodiment, in order to determine the second application response delay time, the processors 302 are operable to send a request from a site load balancer associated with the second site to the one or more servers associated with the second site. The request is associated with a first time. The processors 302 are operable to receive a response from the one or more servers. The response is associated with a second time. Upon receiving the first time and the second time, the processors 302 determine a time difference between the first time and the second time to obtain the second application response delay time.

Upon receiving the second active response delay time and the second application response delay time, the processors 302 compound the second active response delay time and the second application response delay time to produce a second compounded response delay time.

Furthermore, the processors 302 compare the first compounded response delay time and the second compounded response delay time. Based on the comparison, the processors 302 are operable to perform load balancing between the first site and the second site. The processors 302 coordinate the load balancing between the first site and the second site based on results of the comparison between the first compounded response delay time and the second compounded response delay time. In an example embodiment, the processors 302 route a client request to the site with the lowest compounded response delay time.

In further example embodiments, the processors 302 are operable to store the first active response delay time and the first application response delay time into a database. Furthermore, the processors 302 are operable to store the second active response delay time and the application response delay time into the database. Upon receiving further client requests, the processors 302 are operable to retrieve the first application response delay time and the first active response delay time from a database, as well as to retrieve the second application response delay time and the second active response delay time from the database. The retrieved data can be used by the processors 302 for performing the load balancing.

In further example embodiments, the processors 302 select the first site and the second site as follows. The processors 302 determine a geographical location for the local DNS server. Furthermore, based on a client request, the processors 302 determine one or more sites from a plurality of sites. The processors 302 further determine a geographical location for the one or more determined sites.

In further example embodiments, the processors 302 are operable to compose a table of responses. The table of responses includes an IP address associated with the local DNS server, an IP address associated with the first site, the first active response delay time, an IP address associated with the second site, the second active response delay time, and so forth.

The system 300 optionally comprises a database 304. The database 304 is operable to store data associated with the first application response delay time, the first active response delay time, the second application response delay time, the second active response delay time, the first compounded response delay time, the second compounded response delay time, and so forth.

Figure 4:
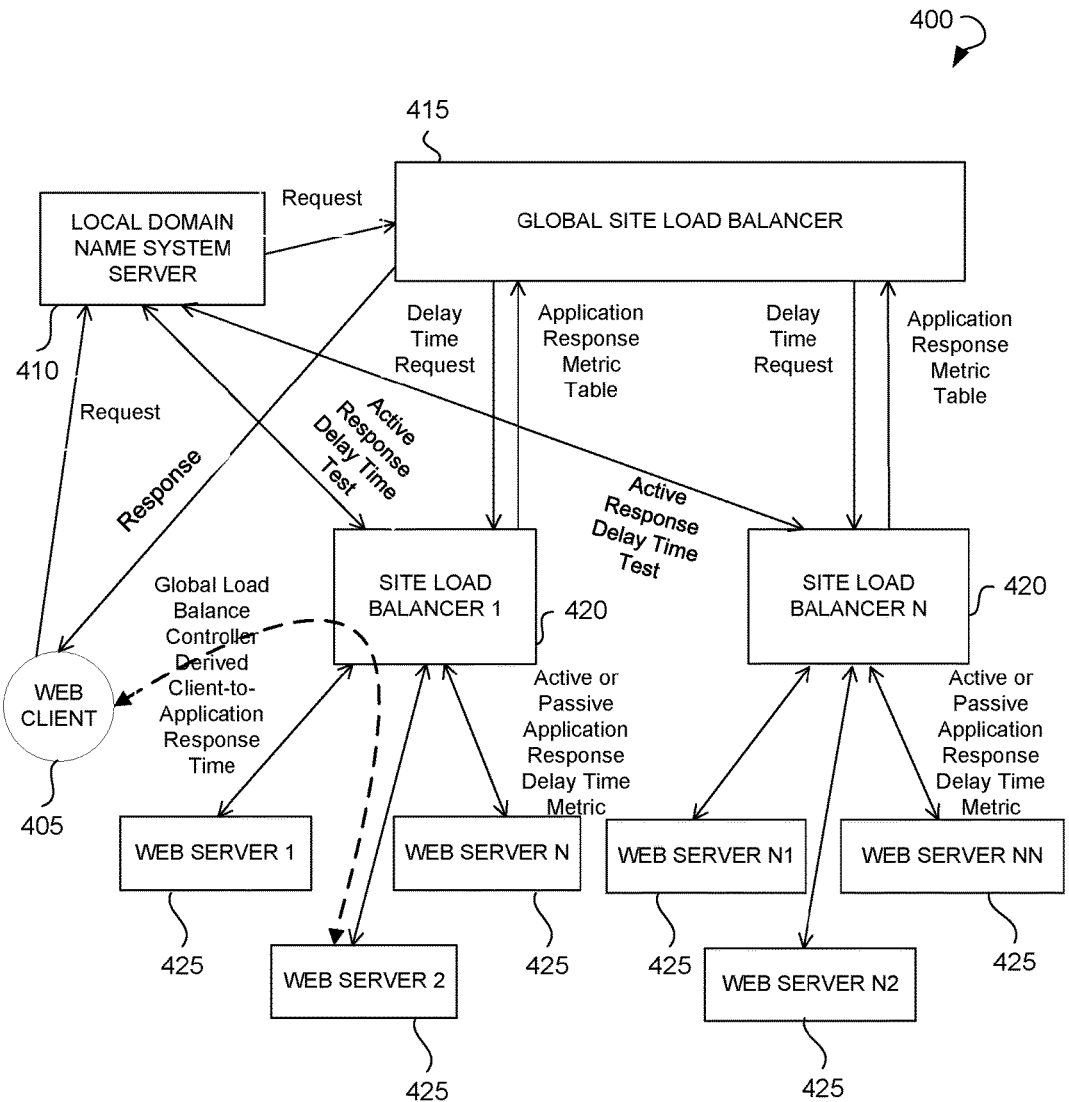
FIG. 4 is a block diagram of a system for load balancing client requests between sites associated with a domain name.

FIG. 4 shows a block diagram 400 for load balancing client requests between sites associated with a domain name. As shown, diagram 400 includes a web client 405 and a local DNS 410 located in the vicinity of the web client 405. A client request from the web client 405 comes to the local DNS 410. The client request includes an HTTP request, an FTP request, and so forth. The local DNS 410 receives the client request and transmits the request to the GSLB 415. The GSLB 415 analyzes a geographic location of the local DNS 410 and selects several sites, the geographic locations of which match the geographic location of the local DNS 410. The GSLB 415 instructs the SLBs 420 associated with the selected sites to send a request to the local DNS 410 to test an active response delay time between each of the SLBs 420 and the local DNS 410. The local DNS 410 sends a response to the requests to each of the SLBs 420. Based on the response, each of the SLBs 420 calculates the active response delay time being a round trip time between each of the SLBs 420 and the local DNS 410.

Furthermore, each of the SLBs 420 performs a calculation of the application response delay time being a round trip time between the SLB 420 and each of the web servers 425 associated with the SLB 420. The SLB 420 can select the web servers 425 to be associated with the client request, based on an HTTP request, an FTP request, and so forth. The SLB 420 can measure the application response delay time in response to the request from the GSLB 415. Alternatively, the SLB 420 continuously, or passively, measures the application response delay time for each of the web servers 425. More specifically, active or passive application response delay time metrics includes performing continuous health checks, determining number of total connections, memory status, dynamic state, network connectivity, responsiveness, and so forth of each of the web servers 425. The measured characteristics can be used for calculation of the application response delay time of each of the web servers 425.

After calculation of the active response delay time and the application response delay time, each of the SLBs 420 calculates the compounded response delay time for each of the web server 425. The compounded response delay time is a sum of the active response delay time and the application response delay time. Each of the SLBs 420 sends the compounded response delay times to the GSLB 415.

The GSLB 415 stores the received compounded response delay times in an application response metric table. The GSLB 415 selects the web server 425 having the lowest compounded response delay time. The GSLB 415 sends a response containing data associated with the selected web server 425 to the web client 405. Therefore, the web client 405 receives GSLB-derived client-to-application response time. The client request is sent to the web server 425 data of which are received in the response from the GSLB.

It should be noted that the selected web server is not necessarily associated with the SLB having the closest geographic location to the web client. Even if the SLB has the closest geographic location to the web client, the total compounded response delay time for a particular web server may be lower than the compounded response delay time for some web server associated with another SLB that is further away from the web client.

Figure 5:
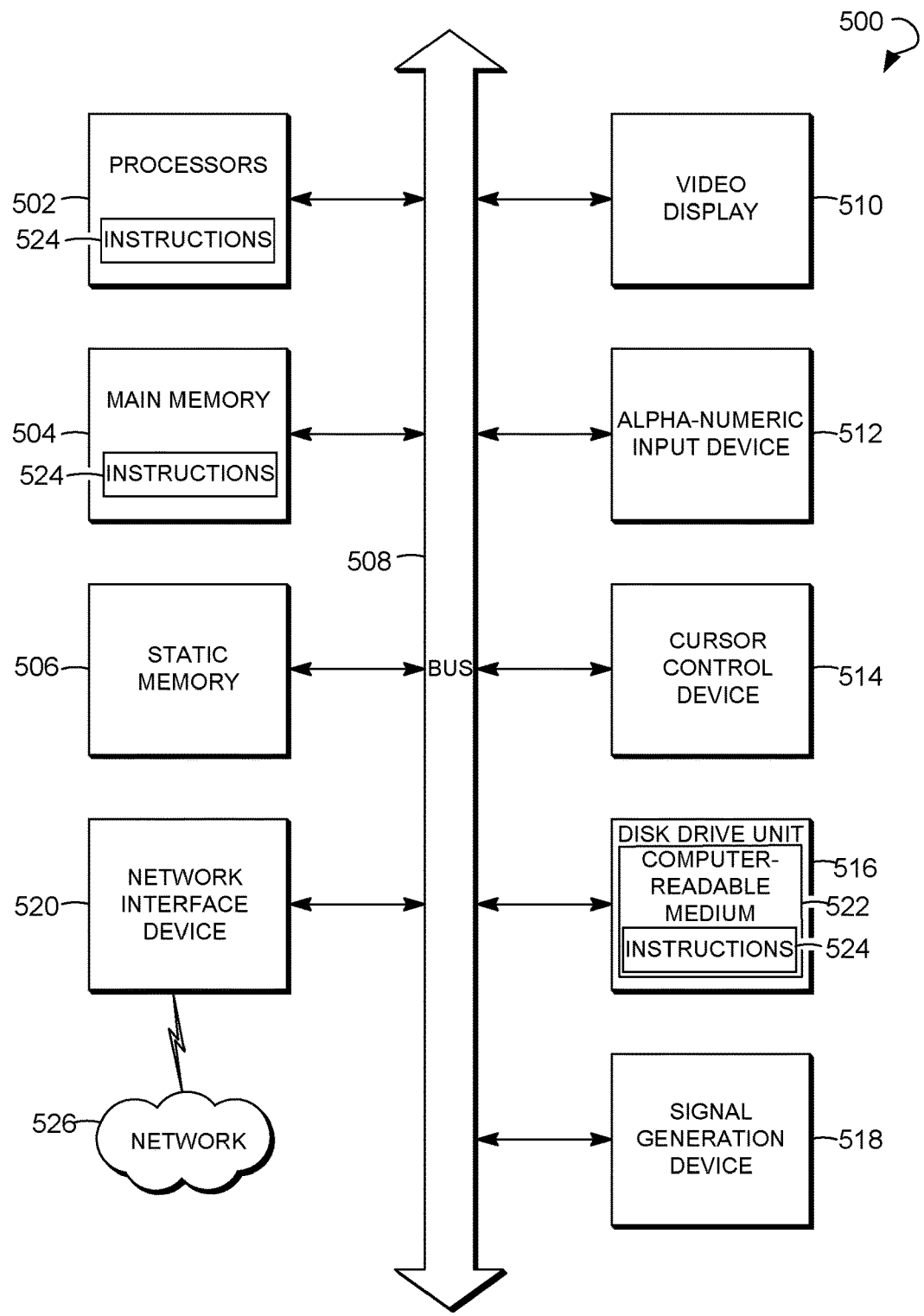
FIG. 5 shows a diagrammatic representation of a computing device for a machine in the example electronic form of a computer system, within which a set of instructions for causing the machine to perform any one or more of the methodologies discussed herein can be executed.

FIG. 5 shows a diagrammatic representation of a machine in the example electronic form of a computer system 500, within which a set of instructions for causing the machine to perform any one or more of the methodologies discussed herein may be executed. In various example embodiments, the machine operates as a standalone device or is connected (e.g., networked) to other machines. In a networked deployment, the machine operates in the capacity of a server or a client machine in a server-client network environment, or as a peer machine in a peer-to-peer (or distributed) network environment. The machine includes a persona computer (PC), a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), a main memory 504 and a static memory 506, which communicate with each other via a bus 508. The computer system 500 further includes a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker), and a network interface device 520.

The disk drive unit 516 includes a non-transitory computer-readable medium 522, on which is stored one or more sets of instructions and data structures (e.g., instructions 524) embodying or utilized by any one or more of the methodologies or functions described herein. The instructions 524 also reside, completely or at least partially, within the main memory 504 and/or within the processors 502 during execution thereof by the computer system 500. The main memory 504 and the processors 502 also constitutes machine-readable media.

The instructions 524 are further transmitted or received over a network 526 via the network interface device 520 utilizing any one of a number of well-known transfer protocols (e.g., HTTP).

While the computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media also includes, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for load balancing client requests between sites associated with a domain name are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for load balancing of Domain Name System (DNS) requests, the system comprising:
  a global site load balancer configured to:
    select a first site load balancer associated with a first site and a second site load balancer associated with a second site, the first site and the second site being associated with a domain name of a client request received from a client;
    instruct the first site load balancer to determine a first compounded response delay and instructing the second site load balancer to determine a second compounded response delay;
  wherein the first site load balancer configured to:
    based on the instructing, determine a first active response delay time between a DNS server and the first site;
    determine a first application response delay time between the first site and one or more first servers associated with the first site;
    determine the first compounded response delay time based on the first active response delay time and the first application response delay time;
  wherein the second site load balancer is configured to:
    based on the instructing, determine a second active response delay time between the DNS server and the second site;
    determine a second application response delay time between the second site and one or more second servers associated with the second site;
    determine the second compounded response delay time based on the second active response delay time and the second application response delay time; and
  wherein the global site load balance is further configured to:
    compare the first compounded response delay time and second compounded response delay time; and
    based on the comparison, select a server from the one or more first servers associated with the first site and the one or more second servers associated with the second site; and
  a database configured to store at least data associated with the first application response delay time, the first active response delay time, the second application response delay time, the second active response delay time, the first compounded response delay time, and the second compounded response delay time.

2. The system of claim 1, wherein the DNS server is a local DNS server.

3. The system of claim 1, wherein the server is selected to answer a DSN request.

4. The system of claim 1, wherein the selecting the server from the one or more first servers associated with the first site and the one or more second servers associated with the second site includes selecting a server associated with a lowest compounded response delay time.

5. The system of claim 1, wherein the determining the first active response delay time includes:
  sending a request from a site load balancer associated with the first site to the DNS server, the request being associated with a first time;
  receiving a response from the DNS server, the response being associated a second time; and
  determining a time difference between the first time and the second time; and
  wherein the determining the second active response delay time includes:
    sending a request from a site load balancer associated with the second site to the DNS server, the request being associated with a first time;
    receiving a response from the DNS server, the response being associated with a second time; and
    determining a time difference between the first time and the second time.

6. The system of claim 1, wherein the determining the first application response delay time includes:
  sending a request from a site load balancer associated with the first site to the one or more servers associated with the first site, the request being associated with a first time;
  receiving a response from the one or more servers associated with the first site, the response being associated with a second time; and
  determining a time difference between the first time and the second time; and
  wherein the determining the second application response delay time includes:
    sending a request from a site load balancer associated with the second site to the one or more servers associated with the second site, the request being associated with a first time;
    receiving a response from the one or more servers associated with the second site, the response being associated with a second time; and
    determining a time difference between the first time and the second time.

7. The system of claim 1, wherein the global site load balancer is further configured to coordinate the load balancing between the first site and the second site.

8. The system of claim 1, wherein the global site load balancer is further configured to:
  determine a geographical location for the DNS server;
  determine one or more sites from a plurality of sites based on a client request;

determine a geographical location for the one or more determined sites;

determine that the geographic location for the DNS server matches the geographic location for the one or more determined sites;

select the first site from the one or more determined sites, wherein a geographic location of the first site matches the geographic location for the DNS server; and select the second site from the one or more determined sites, wherein a geographic location of the second site matches the geographic location for the DNS server.

9. The system of claim 8, wherein the global site load balancer is further configured to compose a table of responses, the table of responses including an IP address associated with the DNS server, an IP address associated with the first site, the first active response delay time, an IP address associated with the second site, and the second active response delay time.

10. A method for load balancing of Domain Name System (DNS) requests, the method comprising:

selecting, by a global site load balancer, a first site load balancer associated with a first site and a second site load balancer associated with a second site, the first site and the second site being associated with a domain name of a client request received from a client;

instructing, by the global site load balancer, the first site load balancer to determine a first compounded response delay and instructing the second site load balancer to determine a second compounded response delay;

based on the instructing, determining, by the first site load balancer, a first active response delay time between a DNS server and the first site;

determining, by the first site load balancer, a first application response delay time between the first site and one or more first servers associated with the first site;

determining, by the first site load balancer, the first compounded response delay time based on the first active response delay time and the first application response delay time;

based on the instructing, determining, by the second site load balancer, a second active response delay time between the DNS server and the second site;

determining, by the second site load balancer, a second application response delay time between the second site and one or more second servers associated with the second site;

determining, by the second site load balancer, the second compounded response delay time based on the second active response delay time and the second application response delay time;

comparing, by the global site load balancer, the first compounded response delay time and second compounded response delay time; and based on the comparison, selecting, by the global site load balancer, a server from the one or more first servers associated with the first site and the one or more second servers associated with the second site.

11. The method of claim 10, wherein the DNS server is a local DNS server.

12. The method of claim 10, wherein the server is selected to answer a DSN request.

13. The method of claim 10, wherein the selecting the server from the one or more first servers associated with the first site and the one or more second servers associated with the second site includes selecting a server associated with a lowest compounded response delay time.

14. The method of claim 13, further comprising routing a client request to one of the first site and the second site, the ne of the first site and the second site being associated with the server associated with the lowest compounded response delay time.

15. The method of claim 10, wherein the determining the first active response delay time includes:

sending a request from a site load balancer associated with the first site to the DNS server, the request being associated with a first time;

receiving a response from the DNS server, the response being associated a second time; and determining a time difference between the first time and the second time; and wherein the determining the second active response delay time includes:

sending a request from a site load balancer associated with the second site to the DNS server, the request being associated with a first time;

receiving a response from the DNS server, the response being associated with a second time; and determining a time difference between the first time and the second time.

16. The method of claim 10, wherein the determining the first application response delay time includes:

sending a request from a site load balancer associated with the first site to the one or more servers associated with the first site, the request being associated with a first time;

receiving a response from the one or more servers associated with the first site, the response being associated with a second time; and determining a time difference between the first time and the second time; and wherein the determining the second application response delay time includes:

sending a request from a site load balancer associated with the second site to the one or more servers associated with the second site, the request being associated with a first time;

receiving a response from the one or more servers associated with the second site, the response being associated with a second time; and determining a time difference between the first time and the second time.

17. The method of claim 10, further comprising reporting results of the comparison between the first compounded response delay time and the second compounded response delay time to a global site load balancer, wherein the global site load balancer coordinates the load balancing between the first site and the second site.

18. The method of claim 10, further comprising:

determining a geographical location for the DNS server;

determining one or more sites from a plurality of sites based on a client request;

determining a geographical location for the one or more determined sites;

determining that the geographic location for the DNS server matches the geographic location for the one or more determined sites;

selecting the first site from the one or more determined sites, wherein a geographic location of the first site matches the geographic location for the DNS server; and selecting the second site from the one or more determined sites, wherein a geographic location of the second site matches the geographic location for the DNS server.

19. The method of claim 18, further comprising composing a table of responses, the table of responses including an IP address associated with the DNS server, an IP address associated with the first site, the first active response delay time, an IP address associated with the second site, and the second active response delay time.

20. A system for load balancing of Domain Name System (DNS) requests, the system comprising:
a global site load balancer configured to:
    select a first site load balancer associated with a first site and a second site load balancer associated with a second site, the first site and the second site being associated with a domain name of a client request received from a client;
    instruct the first site load balancer to determine a first compounded response delay and instructing the second site load balancer to determine a second compounded response delay;
wherein the first site load balancer is configured to:
    based on the instructing, determine a first active response delay time between a DNS server and the first site, wherein the determining the first active response delay time includes:
        sending a request from a site load balancer associated with the first site to the DNS server, the request being associated with a first time;
        receiving a response from the DNS server, the response being associated a second time; and
        determining a time difference between the first time and the second time;
    determine a first application response delay time between the first site and one or more first servers associated with the first site, wherein the determining the first application response delay time includes:
        sending a request from a site load balancer associated with the first site to the one or more servers associated with the first site, the request being associated with a first time;
        receiving a response from the one or more servers associated with the first site, the response being associated with a second time; and
        determining a time difference between the first time and the second time;
    determine the first compounded response delay time based on the first active response delay time and the first application response delay time;
wherein the second site load balancer is configured to:
based on the instructing, determine a second active response delay time between the DNS server and the second site, wherein the determining the second active response delay time includes:
    sending a request from a site load balancer associated with the second site to the DNS server, the request being associated with a first time;
    receiving a response from the DNS server, the response being associated with a second time; and
    determining a time difference between the first time and the second time;
determine a second application response delay time between the second site and one or more second servers associated with the second site, wherein the determining the second application response delay time includes:
    sending a request from a site load balancer associated with the second site to the one or more servers associated with the second site, the request being associated with a first time;
    receiving a response from the one or more servers associated with the second site, the response being associated with a second time; and
    determining a time difference between the first time and the second time;
determine the second compounded response delay time based on the second active response delay time and the second application response delay time; and
wherein the global site load balance is further configured to:
    compare the first compounded response delay time and second compounded response delay time; and
    based on the comparison, select a server from the one or more first servers associated with the first site and the one or more second servers associated with the second site; and
a database configured to store at least data associated with the first application response delay time, the first active response delay time, the second application response delay time, the second active response delay time, the first compounded response delay time, and the second compounded response delay time.

* * * * *